United States Patent [19]
Breslow

[11] 3,949,999
[45] Apr. 13, 1976

[54] OPERATOR PROPELLED TOY VEHICLE

[75] Inventor: Jeffrey D. Breslow, Highland Park, Ill.

[73] Assignee: Marvin Glass & Associates, Chicago, Ill.

[22] Filed: Dec. 20, 1974

[21] Appl. No.: 534,846

[52] U.S. Cl....... 280/1.11 R; 280/267; 280/87.02 R
[51] Int. Cl.² ......................................... B62M 1/00
[58] Field of Search ............ 280/1.11 R, 1.1 R, 202, 280/267, 32.7, 87.01, 87.02 R, 87.04 B, 33.99 A; D34/15 AN, 15 AJ; 206/.81, .84

[56] References Cited
UNITED STATES PATENTS

| | | | |
|---|---|---|---|
| 625,377 | 5/1899 | Blood | 280/267 X |
| 2,482,585 | 9/1949 | Hauptman | 280/202 |
| 3,245,522 | 4/1966 | Pearson | 206/.81 |
| 3,288,478 | 11/1966 | Powers | 280/33.99 A |
| 3,485,314 | 12/1969 | Herr | 280/32.7 X |
| 3,575,250 | 4/1971 | Dykes | 280/32.7 X |
| 3,807,760 | 4/1974 | Jordan | 280/267 |

*Primary Examiner*—Robert R. Song
*Assistant Examiner*—R. Schrecengost
*Attorney, Agent, or Firm*—Coffee & Sweeney

[57] ABSTRACT

An operator propelled toy vehicle having a frame supported on front and rear pairs of rotatable wheels. The axle for the front pair of wheels is pivotally mounted to the frame. A seat for supporting the rider is mounted on the rearward end of the frame and a compartment for receiving dispensable objects is mounted on the pivotable front axle of the frame. The compartment has a top hinged door providing access to the interior thereof. A handle bar also is mounted on top of the compartment for grasping by the rider to steer the vehicle. A coin receiver is provided on the compartment adjacent the handle bar to facilitate the process of selling the dispensable objects.

4 Claims, 8 Drawing Figures

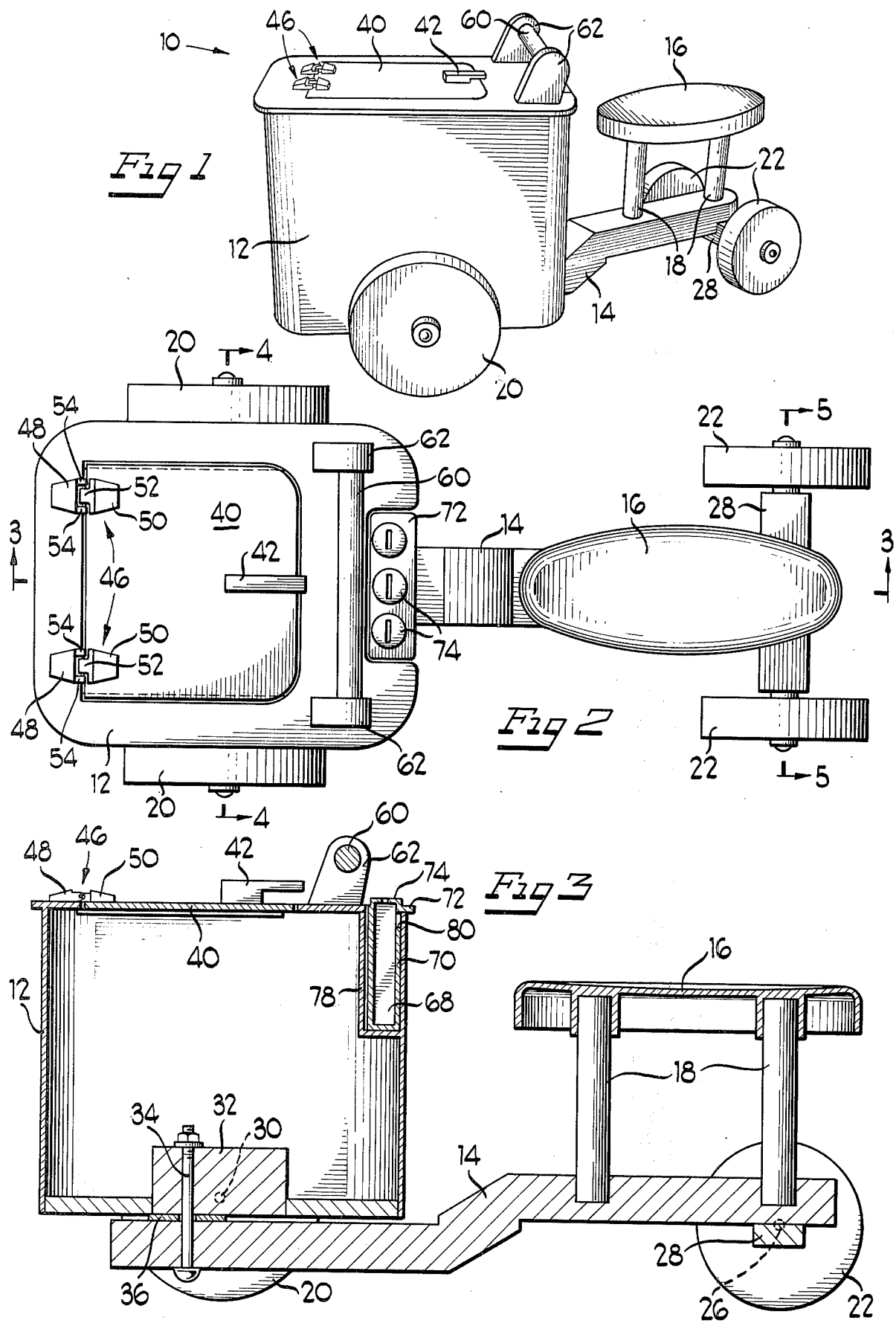

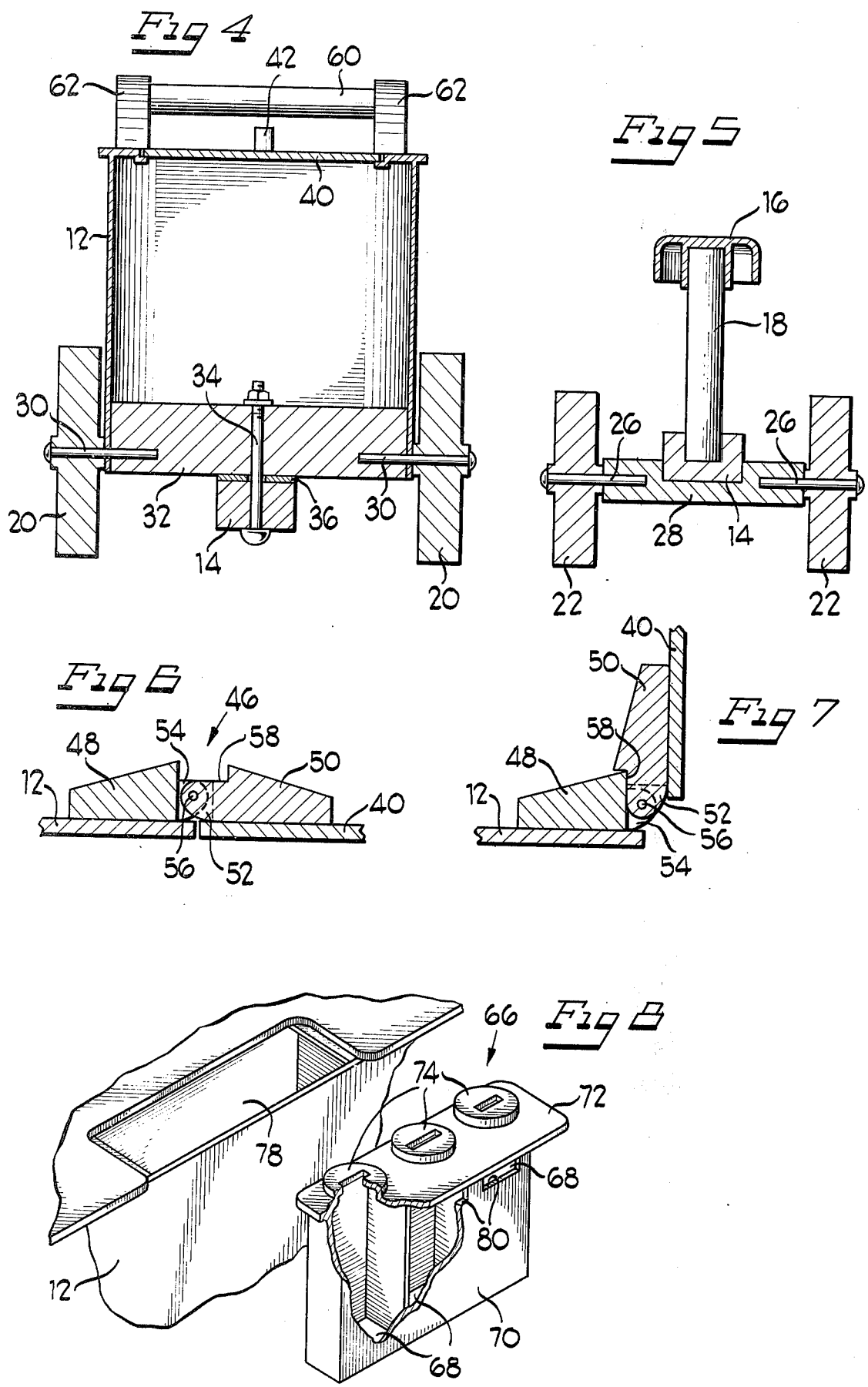

OPERATOR PROPELLED TOY VEHICLE

BACKGROUND AND SUMMARY OF THE INVENTION

This invention relates to a toy device and more particularly to an operator propelled toy vehicle.

There are numerous examples of self-propelled vehicles in the art. Typically, the vehicles are propelled by some sort of pumping motion, such as is associated with bicycles and tricycles. In addition, some vehicles are propelled by direct foot contact with the supporting surface. These types of riding vehicles have been well received by the public, especially children, and there has been a constant desire among children for vehicles of the above type which in addition permit the children to imitate occupational activities of their parents and other adults.

An object of the present invention is to provide a new and improved operator propelled wheeled vehicle of the character described.

The best mode currently contemplated for carrying out the invention includes the provision of a vehicle having a front compartment portion for receiving dispensable objects and a frame structure pivotally mounted to the compartment. The compartment portion and frame structure each have ground engageable rotatable wheels. A handle bar is provided on the front compartment for grasping by the rider to permit steering of the vehicle, and a seat is mounted toward the rear of the frame structure for supporting the rider.

BRIEF DESCRIPTION OF THE DRAWINGS

FIG. 1 is a perspective view of the operator propelled toy vehicle of the present invention;

FIG. 2 is a top plan view, on an enlarged scale, of the toy vehicle of FIG. 1;

FIG. 3 is a vertical section taken generally along the line 3—3 of FIG. 2;

FIG. 4 is a vertical section taken generally along the line 4—4 of FIG. 2;

FIG. 5 is a vertical section taken generally along the line 5—5 of FIG. 2;

FIG. 6 is a fragmentary elevational view, on an enlarged scale, of the door hinge mounted on top of the compartment, shown in a closed position;

FIG. 7 is a fragmentary elevational view similar to that of FIG. 6 showing the door hinge in its open position; and FIG. 8 is a fragmented exploded view of the coin receiver removably positioned on the housing.

DESCRIPTION OF THE PREFERRED EMBODIMENT

The operator propelled toy vehicle, generally designated 10 (FIG. 1), of this invention is intended to be used by children for imitating adult occupational activities such as the dispensing of articles, such as ice cream. The vehicle 10 includes a forward, generally hollow rectangular compartment 12 which is pivotally mounted to a generally longitudinally extending frame member 14. An oval seat 16 is mounted above the rearward portion of the frame 14 by two generally vertical posts 18 for supporting a rider. The frame 14 is offset at the center thereof as seen in FIG. 3 to somewhat raise the seat.

The vehicle is supported by front and rear pairs of ground engageable wheels, 20 and 22, respectively.

The rear wheels 22 each are rotatably mounted to the frame by a shaft 26 which is embedded within a generally rectangular cross brace 28 as seen in FIG. 5 which is appropriately secured to the frame 14. The front wheels 20 similarly are mounted by shafts 30 to a slightly larger rectangular cross brace 32 to the front portion of the frame 14, as shown in FIG. 4.

The front cross brace 32 is pivotally mounted to the frame 14 by a pivot bolt 34 and is provided with a bearing plate 36 between the cross brace 32 and the frame 14 to facilitate the pivotal movement thereof. The front cross brace 32 is secured across the lower interior of the hollow compartment 12 and thereby mounts the compartment so that it can pivot with the cross brace 32 as a unitary structure.

The hollow compartment 12 includes a pivotally mounted door 40 on its top to provide access to the interior thereof. The door 40 includes a handle 42 for grasping by the user for opening the door. The door is pivotally mounted to the top of the compartment 12 by a pair of hinges, generally designated 46, shown in FIGS. 6 and 7. Each hinge 46 includes an upstanding brace 48 on the compartment 12 and another brace 50 on the door 40. The hinge includes a central journal 52 on brace 50 which fits between two journal tabs 54 on brace 48. A shaft or pin 56 is passed through the aligned journal portions 52 and 54 to permit opening of the door. In addition, the brace 50 on the door 40 includes a rectangular or L-shaped slot 58 which limits rotation of the door to approximately 90° in the open position as shown in FIG. 7 by abutment against brace 48.

A handle bar 60 is provided on the compartment 12 and is fastened by a pair of upstanding bar mounts 62 to enable the rider to grasp the handle bar and pivot the compartment 12 and the wheels 20 relative to the frame for steering and controlling the direction of travel of the vehicle.

Referring to FIG. 8, a coin receiver, generally designated 66, is provided to facilitate the making of change during the sale of dispensable objects. The receiver 66 includes three generally vertical compartments 68 for the storage of pennies, nickels and dimes. The vertical compartments 68 are enclosed by a single rectangular shaped housing 70. The housing 70 includes a top flange 72 which can be imprinted with indicia for identifying the coins to be deposited within each compartment 68. Three upper disc portions 74 are provided, one above each compartment 68, with slots therein which are the size of the particular coin to be deposited. The housing 12 includes a small upper, open compartment 78 into which the receiver 66 is removably mounted. The flange 72 on the receiver maintains it on top of the compartment 12 and provides a graspable means to remove the receiver. Three open slots 80 also are provided on the front portion of the receiver housing 70 to permit the receiver to be turned upside down so that coins can be retrieved from each column 68.

The foregoing detailed description has been given for clearness of understanding only and no unnecessary limitations should be understood therefrom as some modifications will be obvious to those skilled in the art.

I claim:

1. A miniature riding toy, comprising:
   a generally hollow front compartment portion for receiving dispensable objects mounted by a single transverse axle to a pair of wheels for rollingly supporting the compartment portion for movement over a subjacent support surface;

a single elongated frame member pivotally mounted by a single generally vertical pin in a flush relationship to the underside of said compartment portion for rotation relative thereto about said pin and having an offset portion extending rearwardly and above the bottom of the compartment portion;

a second pair of wheels mounted by a transverse axle to said rearwardly extending portion of said frame structure for rollingly supporting the same for movement over the support surface;

a seat mounted by a pair of upstanding posts to said rearwardly extending portion of said frame member in position for supporting a rider so as to be capable of propelling the vehicle over the support surface; and handle means mounted on the top of said compartment portion near the rear thereof for grasping by the rider and manipulating said compartment portion about said vertical pin to guide the vehicle as the rider sits on said seat and propels the vehicle over the support surface.

2. The miniature riding toy as set forth in claim 1 including a door disposed on top of the compartment portion permitting access to the interior thereof and hinge means having stop means to limit rotation of said door approximately 90° to a generally vertical position.

3. The miniature riding toy as set forth in claim 1 including a coin receiver on the front compartment portion to facilitate the making of change in the sale of objects from the front compartment portion.

4. The operator-propelled toy vehicle as set forth in claim 3 wherein the coin receiver has aperture means for the retrieval of coins therefrom, said aperture being blocked by a portion of said compartment when the receiver is positioned thereon.

* * * * *